(12) United States Patent
Doffin et al.

(10) Patent No.: US 8,497,588 B2
(45) Date of Patent: Jul. 30, 2013

(54) METHOD FOR CONTROLLING REVERSIBLE ELECTRICAL MACHINE COUPLED TO HEAT ENGINE, START/STOP SYSTEM SUITABLE FOR CARRYING OUT THE METHOD, AND USE THEREOF

(75) Inventors: Hugues Doffin, Chatenay Malabry (FR); Oussama Rouis, Lavallois Perret (FR); Julien Masfaraud, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 637 days.

(21) Appl. No.: 12/301,869

(22) PCT Filed: May 3, 2007

(86) PCT No.: PCT/FR2007/051209
§ 371 (c)(1),
(2), (4) Date: Aug. 11, 2010

(87) PCT Pub. No.: WO2008/000977
PCT Pub. Date: Jan. 3, 2008

(65) Prior Publication Data
US 2010/0295300 A1    Nov. 25, 2010

(30) Foreign Application Priority Data
Jun. 28, 2006  (FR) ...................................... 06 52687

(51) Int. Cl.
*F02B 63/04*    (2006.01)
*H02K 7/18*    (2006.01)

(52) U.S. Cl.
USPC ......................................................... 290/1 A

(58) Field of Classification Search
USPC ................. 290/1 A, 1 C, 22, 24, 25, 31, 40 C
See application file for complete search history.

(56) References Cited

U.S. PATENT DOCUMENTS

| | | | |
|---|---|---|---|
| 6,938,713 B1 | 9/2005 | Tahara et al. | |
| 2007/0057511 A1 * | 3/2007 | Taspinar et al. | 290/22 |

FOREIGN PATENT DOCUMENTS

| | | |
|---|---|---|
| EP | 1 219 493 | 7/2002 |
| FR | 2 854 746 | * 11/2004 |
| JP | 59 158331 | 9/1984 |
| JP | 07 075394 | 3/1995 |

* cited by examiner

*Primary Examiner* — Javaid Nasri
(74) *Attorney, Agent, or Firm* — Berenato & White, LLC

(57) ABSTRACT

The invention relates to a method for controlling a reversible electrical machine (14) coupled to a heat engine (13). The electrical machine comprises a field winding (20) which is fed by an excitation current and an armature comprising a plurality of phase windings (22) fed by phase currents. According to the invention, the excitation current of the electrical machine is controlled according to the instantaneous rotational speed of the machine and the torque of the heat engine. According to other characteristics, the excitation current is equal to a pre-determined nominal current when the torque of the engine is resistant and the instantaneous speed is slower than a first pre-determined rotational speed, and is weaker than the nominal current when the torque of the engine is driving or the instantaneous speed is faster than the first speed.

12 Claims, 3 Drawing Sheets

METHOD FOR CONTROLLING REVERSIBLE ELECTRICAL MACHINE COUPLED TO HEAT ENGINE, START/STOP SYSTEM SUITABLE FOR CARRYING OUT THE METHOD, AND USE THEREOF

CROSS-REFERENCE TO RELATED APPLICATIONS AND CLAIM TO PRIORITY

This application relates to International Application No. PCT/FR2007/051209 filed May 3, 2007 and French Patent Application No. 0652687 filed Jun. 28, 2006, of which the disclosures are incorporated herein by reference and to which priority is claimed.

TECHNICAL FIELD OF THE INVENTION

The present invention relates to a method for controlling a reversible electrical machine coupled to a heat engine such as an alternator-starter of a vehicle, particularly of an automobile.

The invention also relates to an engine suitable for carrying out this method, as well as the use of the method in different operational phases of the engine.

TECHNOLOGICAL BACKGROUND OF THE INVENTION

With the aim of saving energy and protecting the environment, it is intended to bring into general use the installation of automatic start/stop systems in automobiles.

The principle of operation of these systems consists, in certain conditions, of bringing about the complete stop of the heat engine when the vehicle is itself at a standstill, then of restarting the heat engine as a result, for example, of an action of the driver which is interpreted as a request to restart.

In contrast to traditional starters formed by electrical motors which are more or less perfected, the electrical machines used in these "Stop and Go" systems are generally reversible, i.e. able to function either as starter or as alternator. The replacement of two distinct machines by a single machine assists the optimisation of the use of the energy available on board the vehicle.

In a familiar manner, the alternator/starter is either linked to the flywheel of the heat engine, being integrated therewith, or brought into rotation by the crankshaft by means of a transmission by pulleys and belt, for example.

The characteristics of the alternator/starter, generally of polyphase machines, are optimised according to the mode of operation required in controlling in an appropriate manner the currents which feed the phases.

One example of the method of controlling a rotating polyphase reversible electrical machine for an automobile with a heat engine is described in French Patent Application FR2854746.

The method of control described in this document allows one to obtain an optimum torque depending on the rotational speed of the machine when it functions as an electric motor (starter mode or auxiliary motor mode), including high speed.

However, in this method, the excitation current is constant and equal to a nominal current applied during starting, namely when it is found that the more the speed increases, the less suitable a maximum excitation current is for maximising the torque or the output.

The method described is thus not totally adapted to new uses of alternators-starters in automobiles, such as dynamic assistance (the electrical machine obtains temporary additional power during overtaking, for example), or the accompaniment of the heat engine in a stop phase in order to limit vibrations, which requires precise suitability, for all engine speeds, of the torque supplied by the electrical machine to the torque of the heat engine to which it is mechanically coupled.

GENERAL DESCRIPTION OF THE INVENTION

The present invention therefore aims to improve actual control of the electrical machines which are used particularly in automatic start/stop systems.

It relates more precisely to a method for controlling a reversible electrical machine coupled to a heat engine, which machine comprises a field winding which is fed by an excitation current and an armature comprising a plurality of phase windings fed by phase currents.

The method according to the invention is remarkable in that the excitation current of the electrical machine is controlled depending on the instantaneous rotational speed of this machine and on the torque of the heat engine.

In this method, the excitation current is advantageously:
 equal to a pre-determined nominal current when the torque of the heat engine is resistant and the instantaneous speed is slower than a first pre-determined rotational speed;
 weaker than the nominal current when the torque of the heat engine is driving or the instantaneous speed is faster than the first speed.

The excitation current is preferably substantially equal to an optimum current corresponding to an optimum output of the electrical machine when the torque of the heat engine is driving and the instantaneous speed is faster than a second pre-determined rotational speed.

The excitation current is also preferably equal to an intermediate current between the nominal current and the optimum current when the instantaneous rotational speed of the electrical machine is between the first speed and the second speed.

It is beneficial that the excitation current and the phase currents are controlled such that the torque of the electrical machine:
 is at its maximum and substantially constant when the instantaneous speed is slower than a first speed;
 is driving and decreasing when the instantaneous speed increases from the first speed to the second speed;
 remains driving when the instantaneous speed increases up to a third speed corresponding to the maximum speed of the heat engine.

According to the method of the invention, the torque of the heat engine is preferably determined depending on the operational parameters of this engine.

The invention also relates to an engine suitable for carrying out the method described above, of the type comprising:
 a heat engine linked to an electronic interface box which transmits the operational parameters of the engine;
 a reversible electrical machine comprising a rotor coupled to the engine, a field winding which is fed by an excitation current, an armature comprising a plurality of phase windings fed by phase currents, and a sensor of the position of the rotor;
 an electronic control module of the machine comprising a first power unit feeding the phase windings, a second power unit supplying an excitation current to the field winding, a logical unit for acquiring signals emitted by the sensor and for control of the first unit.

The engine according to the invention is remarkable in that the logical unit also controls the excitation current depending on the torque of the heat engine.

This logical unit preferably comprises memorisation means for values which are representative of the intensity of the excitation current depending on variables which are representative of the rotational speed of the rotor.

The logical unit advantageously alternatively comprises memorisation means for values which are representative of the intensity of said excitation current depending on variables which are representative of the rotational speed of the rotor and of the torque of the engine.

The logical unit more advantageously also comprises acquisition means for said operational parameters of the engine, and alternatively memorisation means for values which are representative of the intensity of said excitation current depending on variables which are representative of the rotational speed of said rotor and of said parameters.

According to an additional characteristic of the engine according to the invention, the second power unit comprises a voltage up converter.

The method of controlling a reversible electrical machine coupled to a heat engine explained above is expediently used in the course of starting, getting up to engine speed, permanent engine speed or the stop of the engine of which the characteristics are cited above.

These essential specifications will have made evident to the person skilled in the art the advantages provided by the invention over the prior art.

The detailed specifications of the invention are cited in the description which follows with reference to the enclosed drawings. It should be noted that these drawings have no other purpose but to illustrate the text of the description and do not constitute any sort of limitation of the scope of the invention.

DESCRIPTION OF THE PREFERRED EMBODIMENTS OF THE INVENTION

Figure 1:
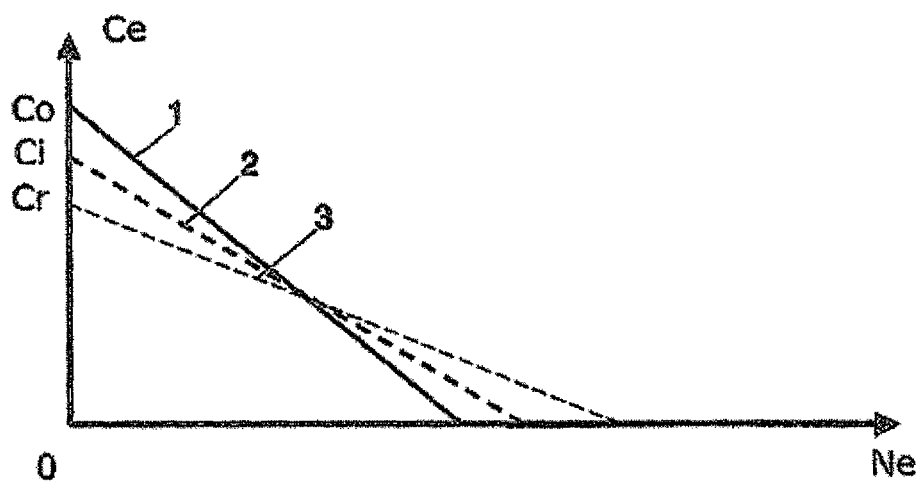
FIG. 1 shows the typical variation known to the person skilled in the art of the torque of an electrical machine depending on the rotational speed for different constant values of the excitation current (average feed current of the constant phases).

In a typical manner, the torque Ce of an electrical machine, the average feed current of the phases and the excitation current of which are constant, decreases linearly depending on the rotational speed Ne, as FIG. 1 shows.

The slope of straight lines 1, 2, 3 which are representative of the torque/speed characteristics decreases for nominal intensities of the excitation current decreasing corresponding to decreasing starting torques Co, Ci, Cr. The torque Ce is rapidly cancelled out for elevated speeds Ne.

This type of control with constant excitation and phase currents is therefore not suitable if the electrical machine must supply a significant torque Ce to an elevated rotational speed Ne.

Figure 2:
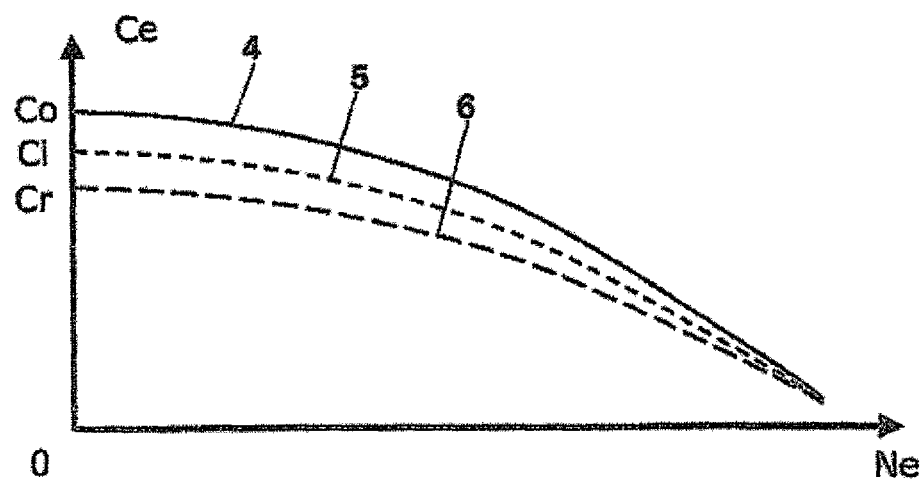
FIG. 2 shows the typical variation known to the person skilled in the art of the torque of an electrical machine depending on the rotational speed for different constant values of the excitation current (average feed current of the variable phases).

In maintaining the constant excitation current, but varying the average phase current, it is possible in a familiar manner to obtain different torque/speed characteristics 4, 5, 6 from those represented in FIG. 1, and to augment rotational speed Ne for which the torque Ce of the electrical machine is cancelled out, as represented in FIG. 2, for different nominal intensities.

Figure 3:
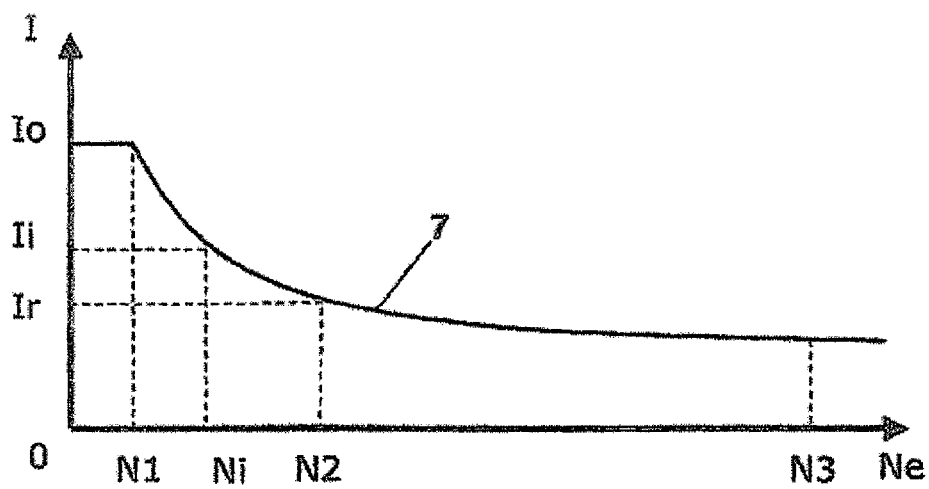
FIG. 3 shows the variation of the excitation current depending on the instantaneous rotational speed of the electrical machine according to the method of the invention.

The method according to the invention consists of the varying excitation current I depending on the speed Ne according to a curve 7 represented in FIG. 3.

From starting up to a first rotational speed N1, the excitation current I is equal to a nominal current Io.

In one preferred embodiment of the invention, this nominal current is 25 A, kept constant up to speed of approximately 500 rpm.

Between this first rotational speed N1 and a second rotational speed N2, the excitation current I decreases as the rotational speed Ne increases such that the torque Ce of the electrical machine at the end of starting of the heat engine corresponds to the mechanical torque necessary to overcome the resistant torque Ct of the engine for each instantaneous speed Ne.

Figure 4:
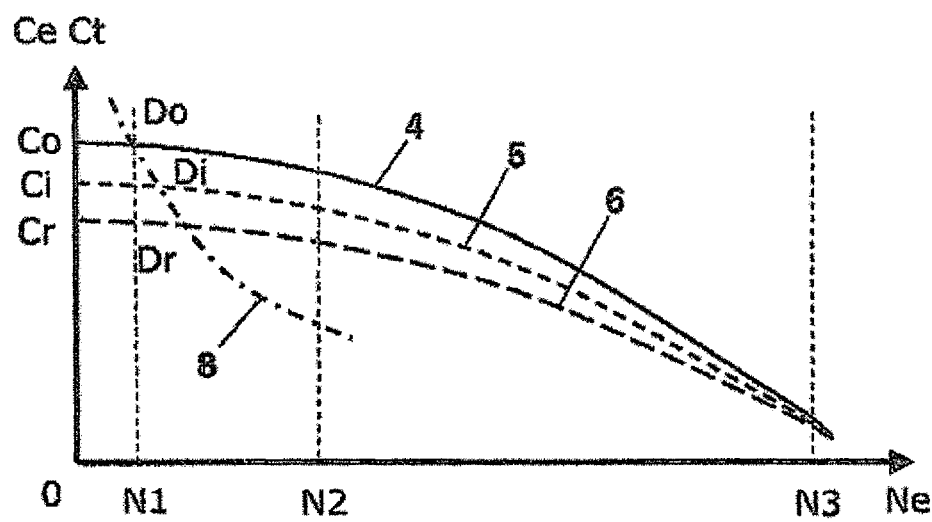
FIG. 4 schematically shows the adaptation of the engine torque of an electrical machine to the resistant torque of a heat engine at the end of the starting phase.

FIG. 4 shows starting points Do, Di, Dr corresponding to the points of intersection of torque/rotational speed characteristic 8 of the heat engine (shown by dot/dash line) and of the torque/speed characteristics 4, 5, 6 of the electrical machine (shown by continuous or dashed lines) for different nominal excitation currents.

The torque of engine Ct at a given instantaneous speed Ne between N1 and N2 determines an operational point Do, Di, Dr to which a particular torque/speed characteristic 4, 5, 6 of the electrical machine corresponds, i.e. a given excitation current I.

Thanks to the method of control according to the invention, the heat engine is "accompanied" in the course of getting up to engine speed; starting is rapid and smooth.

With conventional control of the machine leading to torque/speed characteristics 1, 2, 3, 4, 5, 6 such as those represented in FIG. 1 or 2, the torque Ce of the starter becomes insufficient before the end of starting of the engine (FIG. 1) or is higher than necessary (FIG. 2).

In one preferred embodiment of the invention, the accompaniment of the heat engine is preferably executed up to a second rotational speed N2 in the order of 2000 rpm.

Above this second rotational speed N2 and up to a third rotational speed N3, preferably in the order of 6000 rpm, corresponding to the maximum speed of the heat engine, the excitation current is substantially equal to an optimum current I r corresponding to the optimum output of the electrical machine.

Figure 5:
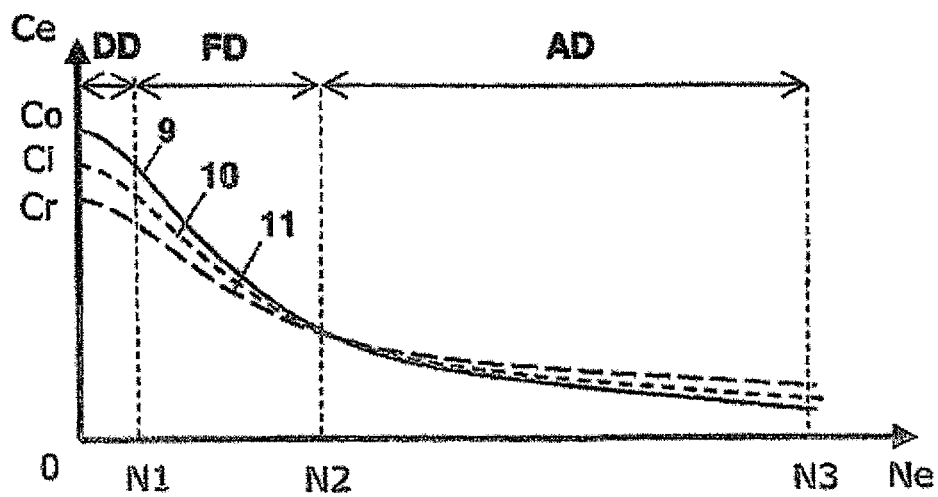
FIG. 5 shows the torque/speed characteristic of an electrical machine, the excitation current of which is controlled according to the method of the invention for different values of the nominal current.

The torque/speed characteristics 9, 10, 11 of the electrical machine resulting from the control of excitation current I and of the phase currents according to the method of the invention are schematically represented in FIG. 5.

In this figure, one sees that the torque Ce is at its maximum and substantially constant up to the first rotational speed N1, namely at the beginning of starting (DD) of the heat engine.

Subsequently, during the end of starting (FD), the torque Ce decreases rapidly up to the second speed N2.

For instantaneous rotational speeds Ne higher than the second rotational speed N2 and up to the third rotational speed N3, the engine torque Ce of the electrical machine stabilises at a significant value.

As a result of this, the electrical machine procures additional power at high engine speed when it is used as dynamic assistance (AD) in an automobile, for example, in the case of overtaking.

The suitability of the torque Ce of the electrical machine for the torque Ct of the heat engine also produces the advantage of reducing vibrations in the stop phase of the engine thanks to the implementation of the method of control according to the invention.

In the same way as the engine is "accompanied" at the end of starting between the first and second speeds N1,N2, it is between these two speeds N2,N1 at the start of the stop phase.

Another advantage of this method of control is also the production of a "fade-in/fade-out" transition of the operational mode as an engine of the electrical machine to the permanent engine speed mode where it functions as a generator. Indeed, in the "alternator" mode, the magnetic flux in the air gap must be lower than that which exists in the "starter" mode.

Defluxing is achieved by reduction of the excitation current according to the method of the invention.

Figure 6:
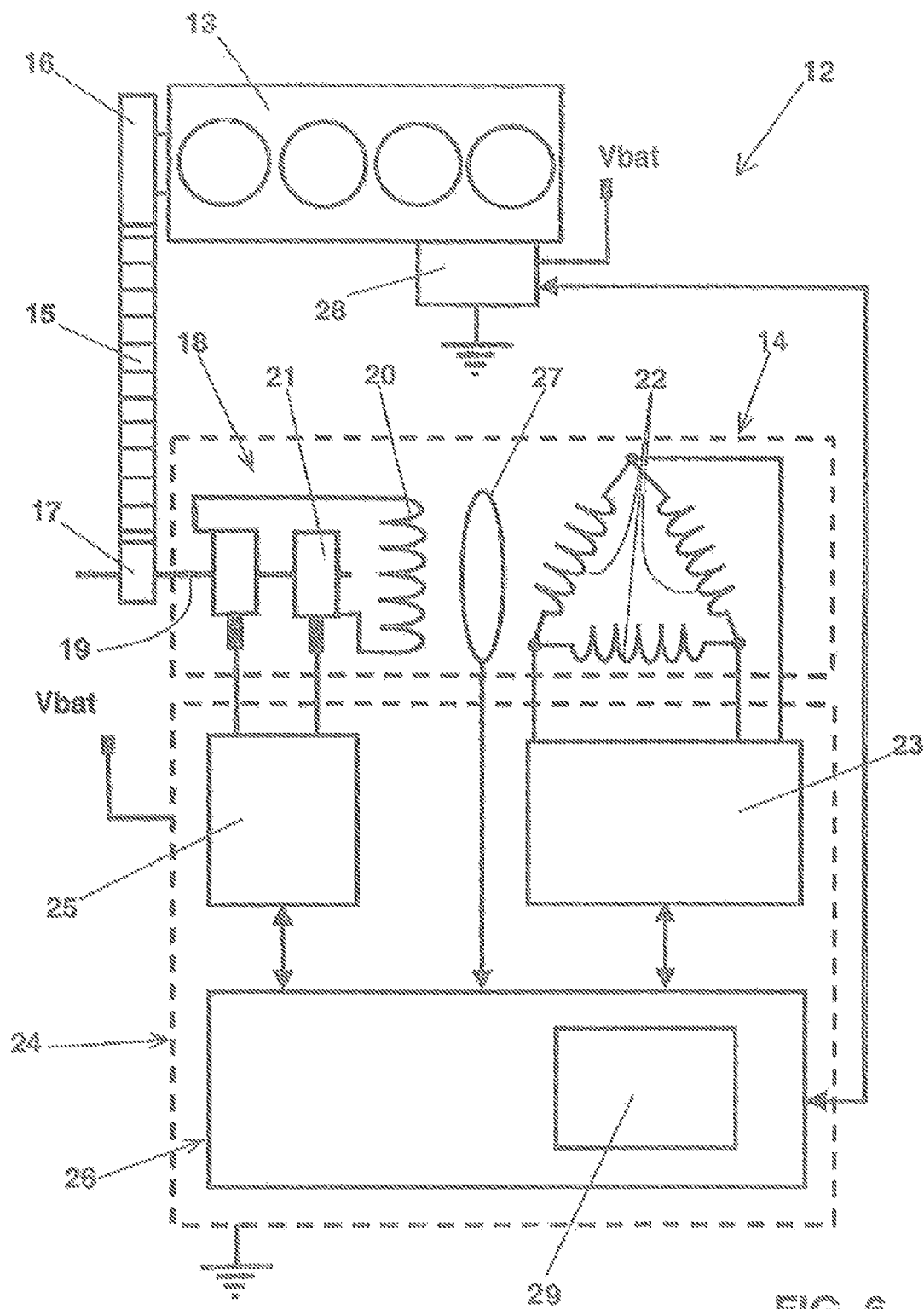
FIG. 6 schematically represents a start/stop system comprising a heat engine and an electrical machine suitable for carrying out the method according to the invention.

The method according to the invention is advantageously carried out for controlling an electrical machine of a start/stop system 12 such as that schematically represented in FIG. 6.

The start/stop system comprises a heat engine 13 which is coupled to a reversible electrical machine 14 by means of a transmission by belt 15 and pulleys 16, 17.

The electrical machine 14 comprises a rotor 18 which is integral with a discharge pulley 17 at the end of shaft 19. The rotor 18 has a field winding 20 fed by means of a turning collector 21.

Machine 14 likewise comprise phase windings 22, or an armature, fed by a first power unit 23 of en electronic control module 24.

A second power unit 25 supplies excitation current I to the rotor 18.

The electronic control module 24 comprises a logical unit 26 which controls the first and second power units 23, 25 depending on the information supplied by a sensor 27 of the position of the rotor 18 and by an electronic interface box 28 linked to the heat engine 13.

The electronic interface box 28 transmits to the electronic control module 24 the operational parameters of the motor 13 which are interpreted in terms of torque Ct by the logical unit 26.

Depending on the variables which are representative of the torque Ct of the heat engine 13 and variables which are representative of the instantaneous speed Ne of the rotor 18 deduced from the information supplied by the sensor 27, the logical unit 26 elaborates variables which are representative of the intensity of the excitation current I.

The variables which are representative of the speed are, for example, the results of measurement by a programmable retarder circuit, linked to the frequency values of the clock and are known per se by the person skilled in the art.

The second power unit 25 is preferably formed by a chopper circuit of feed tension Vbat on board generating impulses, the frequency and the size of which are controlled by the logical unit 26.

In this case, in a manner which is known per se, the variables which are representative of the average intensity I are delays, linked to the clock frequencies, charged in dedicated programmable retarder circuits.

In order to reach the current set points more rapidly, the chopper circuit 25 also functions advantageously as a voltage up converter.

The function linking the excitation current I to the torque of the heat engine 13 and to the instantaneous rotational speed Ne of the electrical machine 14 is preferably tabulated rather then calculated in the logical unit 26.

To this end, the logical unit 26 comprises at least one non-volatile memory 29 having different cartographies used according to the operational phases of the engine 13 such as the phases of starting, dynamic assistance, stop.

In the description above, the field winding of the electrical machine 14 forms the rotor and the armature, the stator. The field winding can inversely form the stator and the armature, the rotor, without this variant departing from the scope of the present invention.

As will be apparent, the invention is therefore not restricted to the preferential embodiments described above.

On the contrary, it encompasses all the possible embodiment variants.

The invention claimed is:

1. A method for controlling a reversible electrical machine (14) coupled to a heat engine (13), said machine (14) comprising a field winding (20) and an armature comprising a plurality of phase windings (22), comprising the steps of:
    feeding said field winding (20) by an excitation current (I);
    feeding said phase windings (22) by phase currents; and
    controlling said excitation current (I) of said electrical machine (14) depending on a rotational speed (Ne) of said electrical machine (14) and a torque (Ct) of said heat engine (13).

2. The method according to claim 1, wherein said excitation current (I) is:
    equal to a pre-determined nominal current (I o) when the torque (Ct) of said engine (13) is resistant and said rotational speed (Ne) is slower than a first pre-determined rotational speed (N1);
    weaker than the nominal current (I o) when said torque (Ct) of said engine (13) is driving or said rotational speed (Ne) is faster than said first speed (N1).

3. The method according to claim 2, wherein said excitation current (I) is substantially equal to an optimum current (I r) corresponding to an optimum output of said machine (14) when the torque (Ct) of said engine (13) is driving and said rotational speed (Ne) is faster than a second pre-determined rotational speed (N2).

4. The method according to claim 3, wherein said excitation current (I) is equal to an intermediate current (I i) between said nominal current (I o) and said optimum current (I r) when said rotational speed (Ne) is between said first speed (N1) and said second speed (N2).

5. The method according to claim 4, wherein said excitation current (I) and said phase currents are controlled such that said torque (Ce) of said machine (14):
    is at its maximum and substantially constant when said rotational speed (Ne) is slower than said first speed (N1);
    is driving and decreasing when said rotational speed (Ne) increases from said first speed (N1) to said second speed (N2);

remains driving when said rotational speed (Ne) increases up to a third speed (N3) corresponding to a maximum speed of said heat engine (13).

6. The method according to claim 1, wherein said torque (Ct) of said heat engine (13) is determined depending on operational parameters of said engine (13).

7. A start/stop system (12), comprising:
a heat engine (13) linked to an electronic interface box (28) which transmits operational parameters of said engine (13);
a reversible electrical machine (14) comprising a rotor (18) coupled to said engine (13), a field winding (20) fed by an excitation current (I), an armature comprising a plurality of phase windings (22) fed by phase currents, and a sensor of a position (27) of said rotor (18);
an electronic control module (24) of said machine (14) comprising a first power unit (23) feeding said phase windings (22), a second power unit (25) supplying an excitation current (I) to said field winding (20), and a logical unit (26) for acquiring signals emitted by said sensor (27) and for controlling said first unit (23);
said logical unit (26) also controlling said excitation current (I) depending on a torque (Ct) of said heat engine (13);
said start/stop system (12) suitable for carrying out a method for controlling said reversible electrical machine (14), the method comprising the steps of:
feeding said field winding (18) by an excitation current (I);
feeding said phase windings (22) by phase currents; and
controlling said excitation current (I) of said electrical machine (14) depending on a rotational speed (Ne) of said machine (14) and said torque (Ct) of said heat engine (13).

8. The start/stop system (12) according to claim 7, wherein said logical unit (26) comprises memorization means (29) for values which are representative of an intensity (I) of said excitation current depending on variables which are representative of said rotational speed (Ne) of said rotor (18).

9. The start/stop system (12) according to claim 7, wherein said logical unit (26) comprises memorization means (29) for values which are representative of an intensity (I) of said excitation current depending on variables which are representative of said rotational speed (Ne) of said rotor (18) and of the torque (Ct) of said engine (13).

10. The start/stop system (12) according to claim 7, wherein said logical unit (26) comprises acquisition means for said operational parameters of said engine (13), and memorization means (29) for values which are representative of an intensity (I) of said excitation current depending on variables which are representative of said rotational speed (Ne) of said rotor and of said operational parameters.

11. The start/stop system (12) according to claim 7, wherein said second power unit (25) comprises a voltage up converter.

12. Use of a method for controlling a reversible electrical machine (14) in the course of starting, getting up to engine speed, permanent engine speed or the stop of a start/stop system (12) comprising:
a heat engine (13) linked to an electronic interface box (28) which transmits operational parameters of said engine (13);
said reversible electrical machine (14) comprising a rotor (18) coupled to said heat engine (13), a field winding (20) which is fed by an excitation current (I), an armature comprising a plurality of phase windings (22) fed by phase currents, and a sensor of a position (27) of said rotor (18);
an electronic control module (24) of said machine (14) comprising a first power unit (23) feeding said phase windings (22), a second power unit (25) supplying said excitation current (I) to said field winding (20), a logical unit (26) for acquiring signals emitted by said sensor (27) and for controlling said first unit (23);
said logical unit (26) also controlling said excitation current (I) depending on said torque (Ct) of said heat engine (13);
said start/stop system (12) suitable for carrying out a method for controlling said reversible electrical machine (14), the method comprising the steps of:
feeding said field winding (18) by an excitation current (I);
feeding said phase windings (22) by phase currents; and
controlling said excitation current (I) of said electrical machine (14) depending on a rotational speed (Ne) of said machine (14) and said torque (Ct) of said heat engine (13).

* * * * *